United States Patent Office 3,399,209
Patented Aug. 27, 1968

3,399,209
2-(2'-OXAZOLIN-2'-YL)-BENZIMIDAZOLES
George Holan, Brighton, Victoria, and Eva Lea Samuel, Bentleigh, Victoria, Australia, assignors to Monsanto Chemicals (Australia) Limited, a company of Victoria, Australia
No Drawing. Filed Dec. 16, 1965, Ser. No. 514,383
Claims priority, application Australia, Dec. 18, 1964, 53,086/64
11 Claims. (Cl. 260—307)

This invention relates to new 2-substituted benzimidazoles which are useful as biological toxicants, particularly in combating helminthiasis, i.e. the treatment of animals suffering from an infestation of the gastro-intestinal tract with parasitic worms. The compounds of the invention combine a high degree of activity towards the parasites with a low toxicity toward the host, and moreover are relatively cheap to manufacture.

The new compounds of the invention are the 2-(2'-oxazolin-2'-yl)benzimidazoles having the structural formula

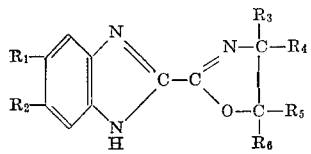

wherein $R_1$ and $R_2$ are selected from hydrogen, halogen, alkyl having 1 to 6 carbon atoms, and alkoxy having 1 to 6 carbon atoms; and $R_3$, $R_4$, $R_5$ and $R_6$ are selected from hydrogen and alkyl having 1 to 6 carbon atoms. $R_1$ and $R_2$ conveniently are selected from hydrogen, chlorine, methyl, ethyl, methoxy and ethoxy, while $R_3$, $R_4$, $R_5$ and $R_6$ conveniently are selected from hydrogen and methyl. Illustrative of the compounds embraced by the invention are 2 - (2' - oxazolin - 2' - yl) - benzimidazole; 2 - (2'-oxazolin - 2' - yl) - 5,6 - dimethylbenzimidazole; 2 - (2'-oxazolin - 2' - yl) - 5 - chlorobenzimidazole; 2 - (2'-oxazolin - 2' - yl) - 5 - methoxybenzimidazole; 2 - (4'-methyl - 2' - oxazolin - 2' - yl) - benzimidazole; and 2-(4',4'-dimethyl-2'-oxazolin-2'-yl)-benzimidazole.

Compounds in accordance with the invention may be prepared by the method which comprises reacting a 2-substituted benzimidazole with an alkanolamine as illustrated in the following equation:

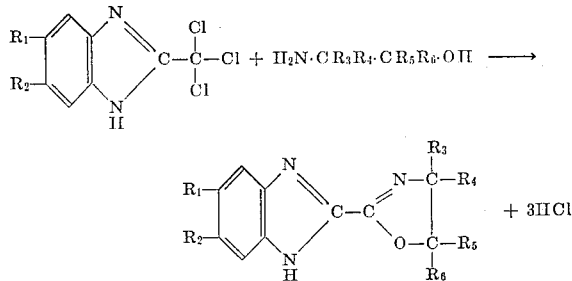

wherein $R_1$, $R_2$, $R_3$, $R_4$, $R_5$ and $R_6$ are as defined above. Thus, 2-trichloromethylbenzimidazole reacts spontaneously on mixing with an excess of ethanolamine at room temperature to give 2-(2'-oxazolin-2'-yl)-benzimidazole in high yield.

An inert diluent or solvent, such as 1,2-dimethoxyethane or ethyl acetate may be used to give a more easily controlled reaction. The order of mixing of reagents or the molar proportion is not critical, however, an excess of the ethanolamine is preferred since this serves to neutralize the hydrogen chloride formed in the reaction. The reaction temperature preferably is held as low as possible in order to minimize the extent of side-reactions. The optimum temperatures vary appreciably with the nature of the substituents $R_1$, $R_2$, $R_3$, $R_4$, $R_5$ and $R_6$, but is in general of the order of 20–80° C. The reaction product is separated from solvent and ethanolamine hydrochloride by conventional means.

Preparation of the new compounds is illustrated in the following non-limitative practical example:

EXAMPLE

2 - (2' - oxazolin - 2' - yl) - benzimidazole was prepared as follows:

Ethanolamine (4 g. 0.066 mole) was added to a hot solution of 2-trichloromethylbenzimidazole (4.8 g. 0.02 mole) in 1,2-dimethoxymethane. An immediate reaction occurred and solid was precipitated. The reaction mixture was allowed to cool to room temperature over 2 hours, then the solid was filtered off and washed with water giving 2-(2'-oxazolin-2'-yl)-benzimidazole in 64% yield. Recrystallization from methanol gave colorless prisms, M.P. 268° C. Found: C, 64.4; H, 5.2; H, 22.8% and $C_{10}H_9N_3O$ requires: C, 64.2; H, 4.9; N, 22.5%.

Anthelmintic activity of 2-(2'-oxazolin-2'-yl)-benzimidazole, as representative of the specified compounds, was assessed by the modified McMaster egg counting technique as described by H. B. Whitlock and H. McL. Gordon; J. Coun. Sci. Ind. Res. (Aust) 12: page 50, 1939 and H. B. Whitlock, J. Coun. Sci. Ind. Res. (Aust) 21: page 177, 1948. Lambs 4–5 months old were infested with larvae of *Haemonchus contortus*; the lambs feces were examined at intervals for eggs of *Haemonchus contortus* to insure that infestation had been effected; and the lambs were then dosed with the test compound at a rate of 100 mg./kg. of body weight. Anthelmintic efficiency, which was assessed by determining the number of eggs/gram in feces passed on each of the seven days following treatment, showed a 100% reduction in egg count, indicating a high anthelmintic efficiency.

Veterinary application of the specified compounds of the invention for the treatment of helminthiasis in animals can be carried out using anthelmintic preparations, for example, in the form of an aqueous suspension ready to use or in the form of a water-wettable or water-dispersible powder which is mixed with water prior to use as a drench; or in the form of suitably formulated tablets or capsules; or the specified compounds may be admixed with animal feedstuffs, as a dry powder or in granulated form. The anthelmintic preparations containing the specified compounds of the invention are preferably administered orally, as a liquid drench, or as a tablet or capsule, in unit dosage form, since this is generally considered to be the most effective manner of combatting helminthiasis. Alternatively, the specified compounds of the invention can be incorporated in urea or salt licks or blocks, so that the animals receive the anthelmintic material with the urea or salt.

A liquid-suspension formulation can contain from 3% to 50% by weight, preferably 5% to 30% by weight, of the active compound together with a dispersing agent and stabilizing agent. A typical formulation is as follows:

| | |
|---|---|
| Active compound | 5–15 parts weight. |
| Dispersing agent | ½–2 parts weight. |
| Stabilizing agent | 1–15 parts weight. |
| Preservative | As required. |
| Water | Sufficient to make 100 parts. |

Suitable dispersing agents are those containing sulphonate groups, for example, sodium lignin sulphonate or the sulphonated phenol or naphthol formaldehyde polymers. Bentonite may be employed as the stabilizing agent, although it is possible to use such protective colloids as polyvinyl alcohol, carboxymethyl cellulose, sodium alginate and the like. The formulations can be prepared by mixing the active compound and the water which already contains dissolved therein the dispersing agents, and other components very vigorously by means of suitable mechanical mixing equipment.

A wettable or water-dispersible powder formulation may contain about 50% to 98% by weight of the active compound together with a wetting agent and dispersing agent. A diluent such as kaolin can also be added if a concentration below about 95% by weight is required. An anti-foaming agent, and, in some cases, a stabilizing agent may be present. A typical formulation is as follows:

| | Parts weight |
|---|---|
| Active compound | 50–90 |
| Wetting agent | 0–2 |
| Dispersing agent | 0–2 |
| Stabilizing agent | 0–10 |
| Anti-foaming agent | 0.01–1 |
| Water | 0–5 |

Suitable wetting agents are the nonionic alkylphenylethylene oxide adducts such as an octylphenol or nonylphenol condensed with ten moles of ethylene oxide, or anionic materials such as the synthetic aryl alkyl sulphonates, examples of which are sodium dodecyl benzene sulphonate, or sodium dibutyl naphthalene sulphonate. Usually about 1% w./w. of wetting agent is required. Suitable dispersing agents are similar to those used for liquid suspensions, for example, sodium lignin sulphonate. The anti-foaming agent employed may be either a silicone or such materials as ethyl hexanol, octanol and the like; and the stabilizing agent may again be chosen from bentonite or the water-soluble gums. Water-wettable or water-dispersible powder formulations are prepared by careful and adequate mixing of the active compound with other ingredients with or without the addition of some water using typical powder blending equipment such as a ribbon blender. The powder formulation is stirred into water by the user before application as a drench, in the field.

Tablets or capsules containing the specified compounds of the invention are prepared by intimately mixing and compounding the active component with suitable finely-divided diluents, fillers, disintegrating agents and/or binders such as starch, lactose, talc, magnesium stearate, and vegetable gums. These formulations may be widely varied with respect to their total weight and content of anthelmintic agent, depending on factors such as the type of host animal to be treated, the dose level desired, and the severity and type of parasitic infestation.

Feed supplements, in which the specified compounds of the invention are intimately mixed with a carrier or diluent in finely-divided powder or granular form, are suitable for addition to the animals ration or feedstuff. The carrier or diluent material preferably is one which can be an animal ration ingredient. The supplement should be suitable for direct addition to the animal ration or feedstuff, or, after easy dilution and blending by the user.

What is claimed is:

1. Compounds of the formula

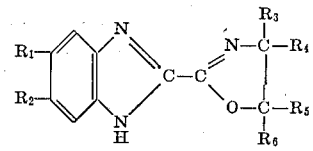

wherein $R_1$ and $R_2$ are selected from the group consisting of hydrogen, alkyl and alkoxy of not more than 6 carbon atoms, and $R_3$, $R_4$, $R_5$ and $R_6$ are selected from the group consisting of hydrogen and alkyl of not more than 6 carbon atoms.

2. Compound of claim 1 which is 2-(2'-oxazolin-2'-yl)-benzimidazole.

3. Compound of claim 1 wherein $R_1$ and $R_2$ are alkyl and $R_3$ and $R_4$ are hydrogen.

4. Compound of claim 1 which is 2-(2'-oxazolin-2'-yl)-5,6-dimethylbenzimidazole.

5. Compound of claim 1 which is 2-(2'-oxazolin-2'-yl)-5-chlorobenzimidazole.

6. Compound of claim 1 which is 2-(2'-oxazolin-2'-yl)-5-methoxybenzimidazole.

7. Compound of claim 1 which is 2-(4'-methyl-2'-oxazolin-2'-yl)-benzimidazole.

8. Compound of claim 1 wherein $R_1$ and $R_2$ are hydrogen and $R_3$ and $R_4$ are alkyl.

9. Compound of claim 1 which is 2-(4',4'-dimethyl-2'-oxazolin-2'-yl)-benzimidazole.

10. Compound of claim 1 wherein $R_1$ and $R_2$ are halogen and $R_3$ and $R_4$ are hydrogen.

11. Compound of claim 1 wherein $R_1$ and $R_2$ are alkyl and $R_3$ and $R_4$ are alkyl.

References Cited

UNITED STATES PATENTS

| | | | |
|---|---|---|---|
| 3,102,074 | 8/1963 | Brown | 167—55 |
| 3,155,571 | 11/1964 | Garett et al. | 167—55 |
| 3,206,468 | 9/1965 | Grenda | 260—307 |

OTHER REFERENCES

Elderfield: Heterocyclic Compounds, vol. V, 1957, pp. 239, 383, 681.

Horben-Weyl: Methoden der Organische Chernie, Sauerstoff Verbindungen III, 1952, p. 426.

NICHOLAS S. RIZZO, *Primary Examiner.*

R. J. GALLAGHER, *Assistant Examiner.*